(12) United States Patent
Miyashita

(10) Patent No.: US 8,619,209 B2
(45) Date of Patent: Dec. 31, 2013

(54) ELECTRO-OPTICAL DEVICE, METHOD OF MANUFACTURING THE SAME, AND ELECTRONIC APPARATUS

(75) Inventor: Tomoaki Miyashita, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 855 days.

(21) Appl. No.: 12/575,766

(22) Filed: Oct. 8, 2009

(65) Prior Publication Data

US 2010/0123850 A1    May 20, 2010

(30) Foreign Application Priority Data

Nov. 14, 2008  (JP) ................................. 2008-292003

(51) Int. Cl.
  *G02F 1/1333*  (2006.01)
  *G02F 1/1335*  (2006.01)
(52) U.S. Cl.
  USPC ............................................. 349/58; 349/65
(58) Field of Classification Search
  USPC ........................................ 349/58, 61, 62, 65
  See application file for complete search history.

(56) References Cited

U.S. PATENT DOCUMENTS

| 5,406,399 A | 4/1995 | Koike | |
| 6,734,928 B2 * | 5/2004 | Ito et al. | 349/58 |
| 6,876,409 B2 * | 4/2005 | Park et al. | 349/58 |
| 2007/0273808 A1 * | 11/2007 | Hsu et al. | 349/58 |
| 2010/0123849 A1 * | 5/2010 | Matsushima | 349/58 |

FOREIGN PATENT DOCUMENTS

| JP | 05-165012 A | 6/1993 |
| JP | 08-005998 A | 1/1996 |
| JP | 2001-33764 A | 2/2001 |
| JP | 2001-125073 A | 5/2001 |
| JP | 2002-40394 A | 2/2002 |
| JP | 2005-77557 A | 3/2005 |
| JP | 2007-232812 A | 9/2007 |

* cited by examiner

*Primary Examiner* — Edward Glick
*Assistant Examiner* — David Chung
(74) *Attorney, Agent, or Firm* — ALG Intellectual Property, LLC

(57) ABSTRACT

An electro-optical device includes an electro-optical panel and a backlight unit. A cover includes a window portion opened in correspondence with a pixel region of the electro-optical panel and a first sidewall provided so as to face the side surfaces of the electro-optical panel and the backlight unit. A frame holds the electro-optical panel and the backlight unit and has a second sidewall provided so as to face the side surfaces of the electro-optical panel and the backlight unit. The first sidewall has an engagement portion engaged with the backlight unit and the second sidewall has a protrusion for guiding the engagement portion to an engagement place.

6 Claims, 7 Drawing Sheets

ELECTRO-OPTICAL DEVICE, METHOD OF MANUFACTURING THE SAME, AND ELECTRONIC APPARATUS

BACKGROUND

1. Technical Field

The present invention relates to an electro-optical device such as a liquid crystal device including an electro-optical panel such as a liquid crystal panel and a backlight unit for irradiating light onto the electro-optical panel, a method of manufacturing the same, and an electronic apparatus including the electro-optical device.

2. Related Art

Electro-optical devices such as liquid crystal devices are used as display devices for computers, mobile telephones or other various electronic apparatuses. In particular, since the liquid crystal devices are light weight, slim and have low power consumption, the liquid crystal devices are widely used as display devices for various electronic apparatuses. In general, in a liquid crystal device, on a rear surface of a liquid crystal panel, an illumination light source and a backlight unit, in which a light guide plate for guiding the light of the light source to the panel, a diffusion plate or the like is configured as one unit, are disposed. The backlight unit irradiates the light from the rear surface side to the liquid crystal panel so as to display a desired image in a pixel region of a front surface side.

In general, the liquid crystal panel and the backlight unit are integrally held by any unit, and are, for example, held in a frame and a cover. If the liquid crystal panel and the backlight unit are held in a frame and a cover, for example, the liquid crystal panel is fitted to and mounted onto one side of the frame (frame case), the backlight unit facing the liquid crystal panel is fitted to and mounted onto the other side of the frame at a rear panel, and a cover (shield case) having a top plate and a sidewall, having a window portion corresponding to a pixel region of the liquid crystal panel, and covering a peripheral region is installed (see JP-A-2005-77557).

However, JP-A-2005-77557 does not disclose the fixing of the cover installed in the frame and the frame or the fixing of the rear panel of the backlight unit and the frame in detail. However, for example, when the cover is completely fixed to the frame by adhesion, the cover cannot easily be detached from the frame. Accordingly, if an abnormality occurs in the liquid crystal panel corresponding to the electro-optical panel, significant labor is required for replacement or repair. If the back panel of the backlight unit is completely fixed to the frame by adhesion, similarly, the backlight unit cannot easily be detached from the frame. Therefore, if an abnormality occurs in the backlight unit, significant labor is required for replacement or repair. Accordingly, an electro-optical device capable of stably holding an electro-optical panel and a backlight unit and easily detaching the electro-optical panel and the backlight has been desired. If the cover engages the backlight unit, it is preferable that the cover can smoothly be engaged and installed.

SUMMARY

An advantage of some aspects of the invention is that it provides an electro-optical device capable of stably and smoothly holding an electro-optical panel and a backlight unit and easily detaching the electro-optical panel and the backlight unit, and a method of manufacturing the same, and an electronic apparatus including the electro-optical device.

Another object of some aspects of the invention is that it provides an electro-optical device capable of smoothly engaging and installing a cover if the cover is engaged with a backlight unit, a method of manufacturing the same, and an electronic apparatus including the electro-optical device.

According to an aspect of the invention, there is provided an electro-optical device including: an electro-optical panel having a pixel region formed of a plurality of pixels and a peripheral region provided in the periphery of the pixel region; a backlight unit disposed in correspondence with the electro-optical panel; a frame which holds the electro-optical panel and the backlight unit; and a cover including a window portion opened in correspondence with the pixel region of the electro-optical panel and covering the peripheral region, wherein the cover has an engagement portion engaged with the backlight unit and the frame has a protrusion on the outer surface of the sidewall of the electro-optical panel side rather than the engagement place of the engagement portion.

According to the invention, by engaging the engagement portion of the sidewall of the cover with the backlight unit, it is possible to stably hold the electro-optical panel and the backlight unit by the frame and the cover. In addition, by guiding the engagement portion of the sidewall of the cover to the protrusion of the frame and performing the engagement with the backlight unit, the cover can smoothly be installed in a state of being engaged with the backlight unit. By releasing the engagement of the engagement portion of the cover, it is possible easily to detach the electro-optical panel and the backlight unit. When the repair or the replacement of the electro-optical panel or the backlight unit is necessary, it is possible easily and rapidly to take countermeasures. In addition, in the case where the electro-optical panel or the backlight unit is adhered to the frame, it is possible to prevent the electro-optical panel or the backlight unit from being detached from the frame even when the adhesion is released.

In the electro-optical device of the invention, the protrusion may have a first surface formed on the side of the electro-optical panel and a second surface formed on the opposite side of the electro-optical panel, and the first surface may be formed as an inclined surface inclined in a direction away from the electro-optical panel.

According to the invention, by forming the first surface of the protrusion provided in the frame to become the inclined surface inclined in the direction away from the electro-optical panel, the sidewall of the cover is guided to the inclined surface and the engagement portion of the cover is more easily guided to the engagement place with the backlight unit.

In the electro-optical device of the invention, an engagement hole may be formed in the sidewall of the cover as an engagement portion, an engagement protrusion may be provided on the backlight unit so as to protrude laterally, and the cover may be installed by engaging the engagement hole with the engagement protrusion.

According to the invention, by engaging the engagement hole of the sidewall of the cover with the engagement protrusion of the backlight unit, it is possible to easily engage the cover with the backlight unit with certainty and easily release the engagement.

In the electro-optical device of the invention, the protrusion may be disposed at a position overlapping with the engagement protrusion in a planer manner.

According to the invention, since a place of maximum deformation due to the protrusion of the sidewall of the cover can overlap with the engagement protrusion, it is possible to suppress deformation of the sidewall of the cover during guiding or detachment and suppress stress applied to the cover due to deformation.

In the electro-optical device of the invention, the protrusion may be provided so as to protrude further than the engagement protrusion.

According to the invention, it is possible to deform outwardly the sidewall of the cover further than the engagement protrusion and more easily engage the engagement hole of the sidewall of the cover with the engagement protrusion.

According to another aspect of the invention, there is provided a method of manufacturing an electro-optical device including a first process of mounting an electro-optical panel having a pixel region formed of a plurality of pixels and a peripheral region provided in the periphery of the pixel region in a frame from one side thereof; a second process of mounting a backlight unit in the frame from the other side thereof so as to face the electro-optical panel; and a third process of moving a cover having a window portion opened in correspondence with the pixel region of the electro-optical pane and covering the peripheral region from one side of the frame, engaging a sidewall of the cover with the backlight unit while guiding the sidewall of the cover to a production provided on the outer surface of the sidewall of the frame, and installing the cover.

According to the invention, by engaging the sidewall of the cover with the backlight unit, it is possible stably to hold the electro-optical panel and the backlight unit by the frame and the cover. In addition, by guiding the engagement portion of the sidewall of the cover to the protrusion of the frame and performing the engagement with the backlight unit, the cover can smoothly be installed in a state of being engaged with the backlight unit. By releasing the engagement of the engagement portion of the cover, it is possible easily to detach the electro-optical panel and the backlight unit. When repair or replacement of the electro-optical panel or the backlight unit is necessary, it is possible to obtain a structure capable of easily and rapidly taking countermeasures. In addition, in the case where the electro-optical panel or the backlight unit is adhered to the frame, it is possible to prevent the electro-optical panel or the backlight unit from being detached from the frame even when the adhesion is released.

In the method of manufacturing the electro-optical device, the first process may include a process of coating an adhesive on one surface of the support portion protruding inwardly from the sidewall of the frame, a process of mounting the electro-optical panel on the support portion from one side so as to be disposed on the frame, a process of moving a pressing jig from one side, engaging a hole formed in a sidewall of the pressing jig with the protrusion while guiding the sidewall of the pressing jig to the protrusion of the frame so as to install the pressing jig and pressing the surface facing one surface of the electro-optical panel to the support portion by a top plate of the pressing jig.

According to the invention, it is possible to bond the electro-optical panel to the support portion of the frame with high strength.

According to another aspect of the invention, there is provided an electronic apparatus including the electro-optical device of the invention.

According to the invention, it is possible to configure the electro-optical device having the effects of the electro-optical device of the invention.

BRIEF DESCRIPTION OF THE DRAWINGS

The invention will be described with reference to the accompanying drawings, wherein like reference numbers represent like elements.

DESCRIPTION OF EXEMPLARY EMBODIMENTS

Electro-Optical Device of First Embodiment

Figure 1A:
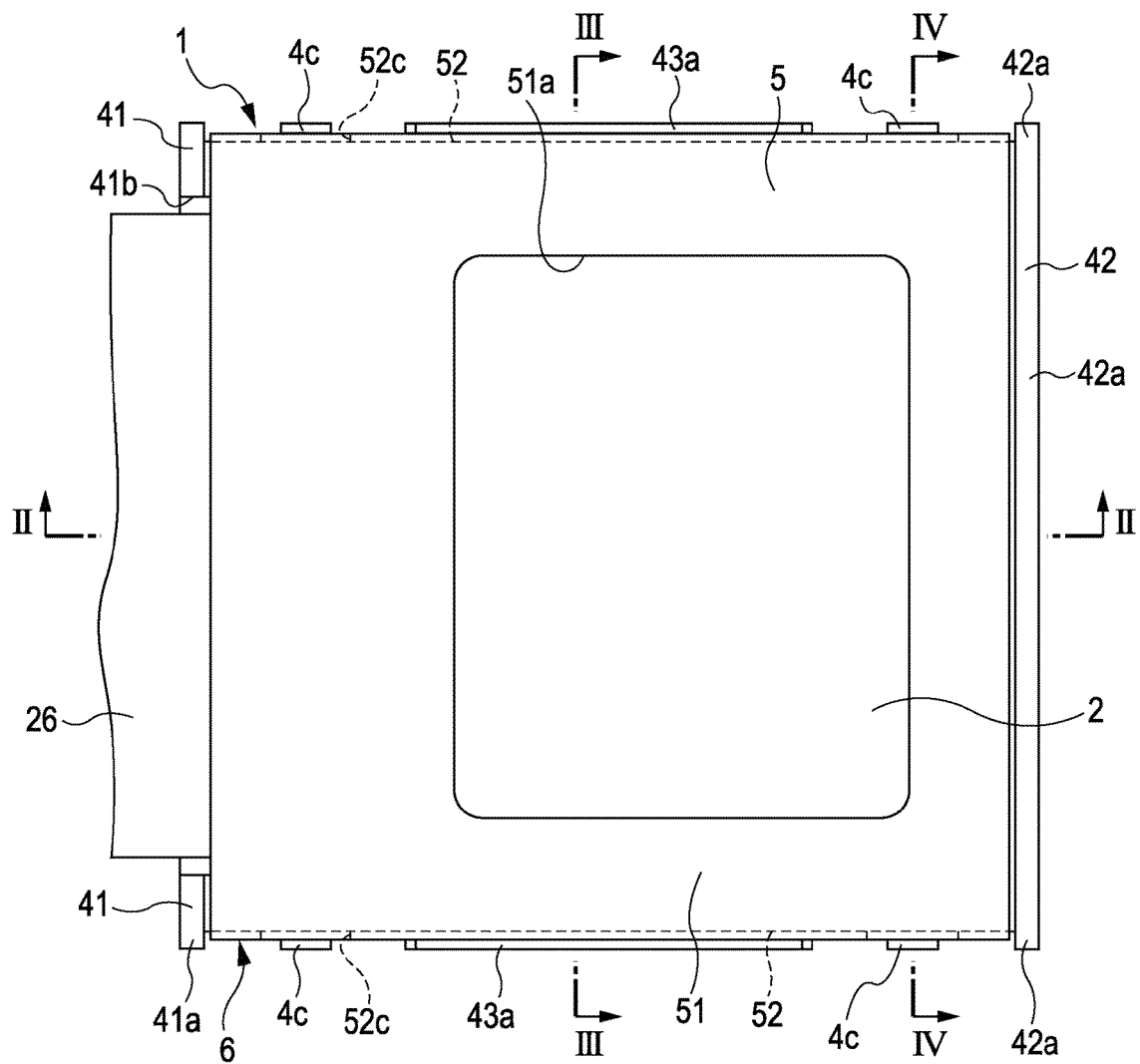
FIG. 1A is a plan view showing a liquid crystal device as an electro-optical device according to a first embodiment of the invention.
Figure 1B:
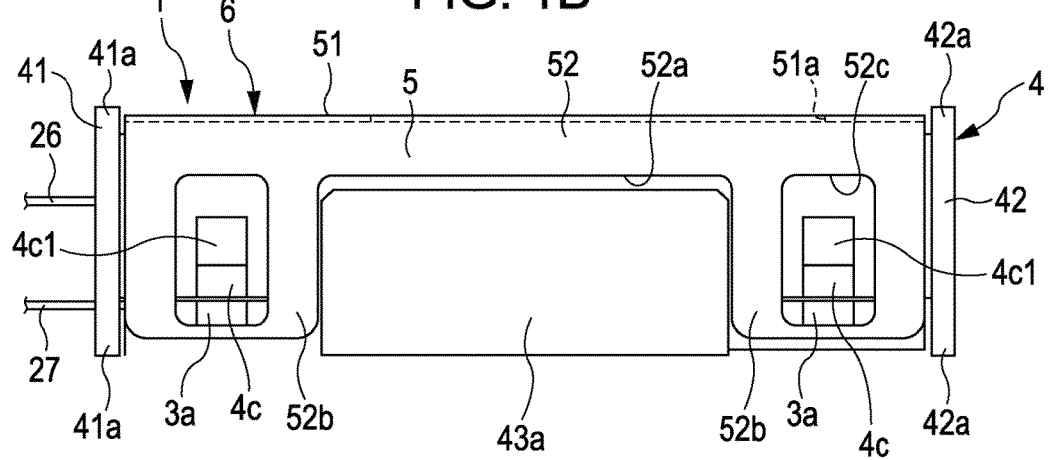
FIG. 1B is a side view thereof.
Figure 2:
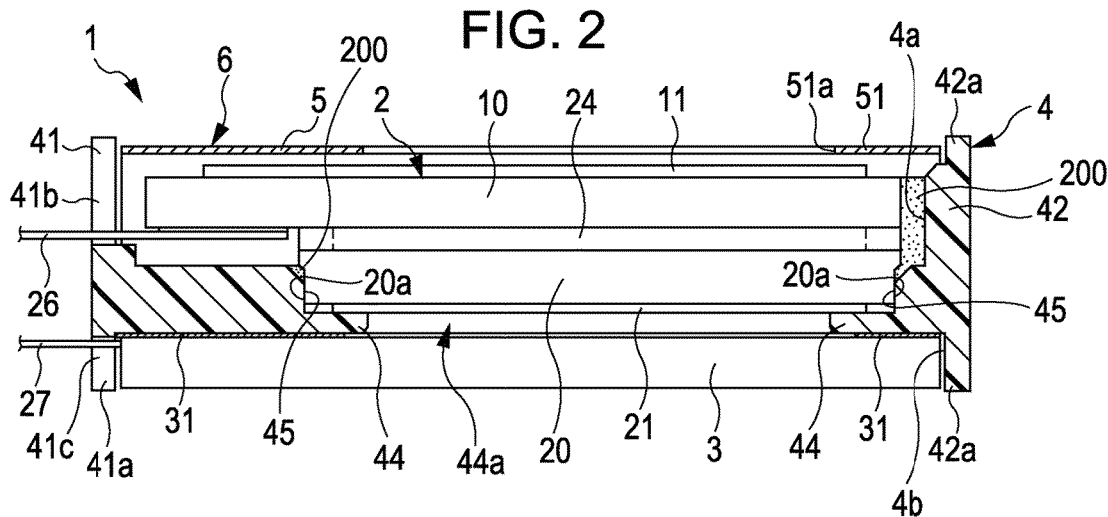
FIG. 2 is a cross-sectional view taken along line II-II of FIG. 1.
Figure 3:
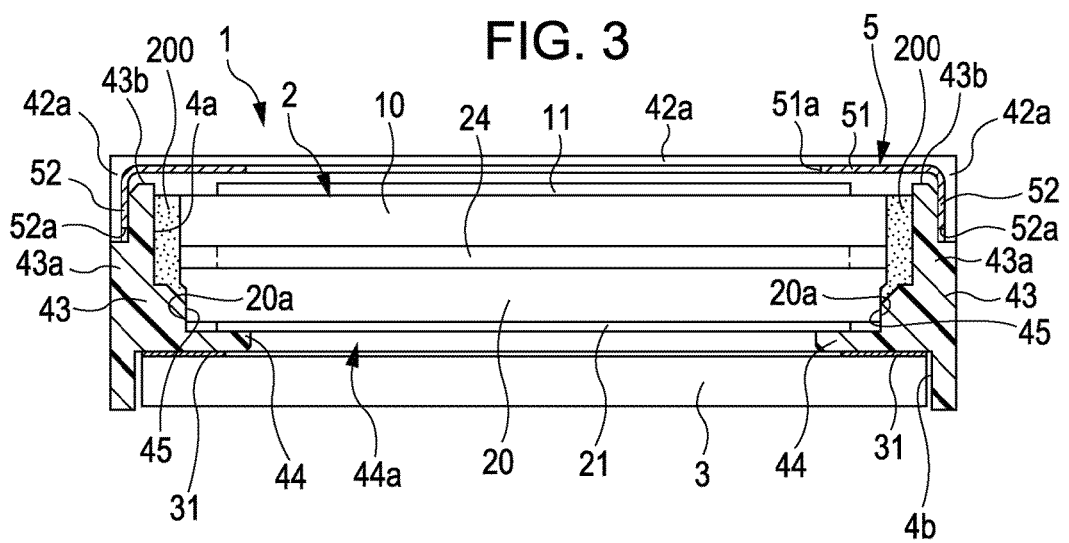
FIG. 3 is a cross-sectional view taken along line III-III of FIG. 1.
Figure 4:
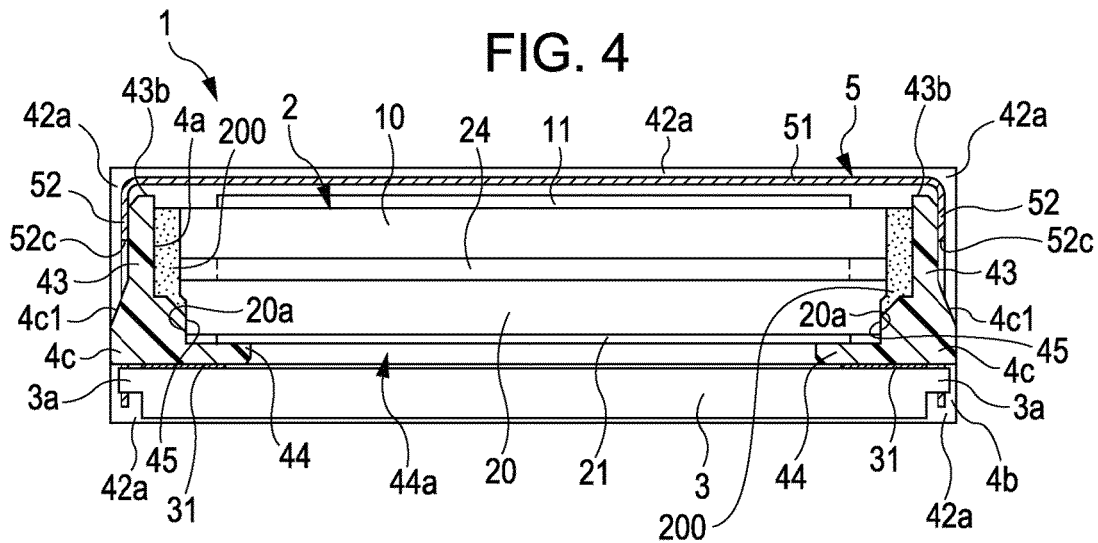
FIG. 4 is a cross-sectional view taken along line IV-IV of FIG. 1.

A liquid crystal device of a first embodiment will be described as an example of an electro-optical device according to the invention. FIG. 1A is a plan view showing an electro-optical device according to the first embodiment, FIG. 1B is a side view thereof. FIGS. 2, 3 and 4 are respectively cross-sectional views taken along line II-II, III-III and IV-IV of FIG. 1.

In the liquid crystal device 1 as the electro-optical device according to the first embodiment, as shown in FIGS. 1 to 4, a liquid crystal panel 2 functioning as an electro-optical panel and a backlight unit 3 disposed on the rear surface side of the liquid crystal panel 2 are held in a mounting case 6. The mounting case 6 includes a frame 4 which is a holding member for holding the liquid crystal panel 2 and the backlight unit 3, and a cover 5 functioning as a holding member which is disposed so as to cover at least a portion of the liquid crystal panel 2 held in the frame 4. The cover 5 is made of a light-shielding member.

As shown in FIGS. 1 to 4, the frame 4 includes sidewalls 41 and 42 facing each other in one direction such as a front-and-rear direction, and sidewalls 43 and 43 facing each other in a direction crossing the facing sidewalls 41 and 42, includes support portions 44 protruding inwardly from the sidewalls 41 to 43, and the cross section thereof is substantially formed in a H-shaped frame shape with the partition-like support portions 44 having a light transmission opening 44a in the center thereof. The frame 4 is, for example, formed of polycarbonate and is colored black. The liquid crystal panel 2 is received and mounted in one concave portion 4a (a concave portion positioned above the support portions 44 in FIGS. 2 to 4) of the H-shaped frame 4 corresponding to one side of the support portions 44, and the backlight unit 3 is received and mounted in the other concave portion 4b (a concave portion positioned below the support portions 44 in FIGS. 2 to 4) corresponding to the other side of the support portions 44.

The liquid crystal panel 2 and the backlight unit 3 are held in the frame 4 so as respectively to be fitted to the concave portions 4a and 4b. The liquid crystal panel 2 is, for example, formed by dicing by half the periphery of a counter substrate 20 from the side opposite to a device substrate 10, and includes inner side surfaces 20 a with a step difference from a side surface of the liquid crystal panel 2. The inner side surfaces 20a are fitted to fitting surfaces 45 protruding inwardly from the sidewalls 41 to 43 so as to be mounted onto the concave portion 4a of the frame 4. That is, the distance between the facing inner side surfaces 20a and 20a of the counter substrate 20 has a fitting size corresponding to the distance between the inwardly facing fitting surfaces 45 and 45 of the frame 4, and the inner side surfaces 20a and 20a of the counter substrate 20 are fitted between the fitting surfaces 45 and 45. The backlight unit 3 is fitted to the surface of the backlight unit side of the support portions 44 and the concave portion 4b composed of the inner surfaces of the sidewalls 41 to 43. Flange-shaped protrusions 41a and 42a, which can prevent light from being leaked from the backlight unit 3, are respectively formed in the sidewalls 41 and 42, and the cover 5 is disposed between the protrusions 41a and 42a.

The liquid crystal panel 2 and the backlight unit 3 are preferably bonded to the frame 4 by an adhesive, such as an elastic adhesive tape or the like, if necessary. In the present embodiment, the liquid crystal panel 2 is fixed to the frame 4 by an adhesive 200 on the inner side surfaces of the sidewalls 41 to 43 or one surface (the upper surface in FIGS. 2 to 4) of each of the support portions 44. The backlight unit 3 is bonded to the other surface (the lower surface in FIGS. 2 to 4) of each of the support portions 44 of the frame 4 using a double adhesive tape 31 having a rectangular frame shape and also functioning as a light-shielding member for preventing light from being irradiated onto a region excluding a predetermined region with respect to the liquid crystal panel 2, and the front ends of the support portions 44 further protrude inwardly than the double-sided adhesive tape 31. If the backlight unit 3 is detachably fixed by the double-sided adhesive tape 31, such as a fine adhesive tape, it is possible to facilitate a detaching operation when detaching the backlight unit 3 from the frame 4.

As shown in FIGS. 1 to 4, the cover 5 has a top plate 51 for covering one surface (the upper surface in FIGS. 2 to 4) of the liquid crystal panel 2 received in the frame 4 and sidewalls 52 and 52 bent from the top plate 51 at about a right angle at both ends of the width direction (the left-and-right direction in FIGS. 3 and 4) of the top plate 51. The top plate 51 covers an outer surface side of one surface side of the liquid crystal panel 2 and the facing sidewalls 52 and 52 cover portions of the outer surfaces of the facing sidewalls 43 and 43 of the frame 4. A window portion 51a formed by opening a portion at a position corresponding to a pixel region 2A of the liquid crystal panel 2 shown in FIG. 5 is provided in the top plate 51 of the cover 5, and the top plate 51 is disposed so as to cover the peripheral region of the pixel region 2A of the liquid crystal panel 2. The cover 5 is, for example, formed of stainless steel, aluminum or the like and a viewable outer side surface thereof is colored black such that display contrast is increased and glare can be prevented during viewing.

In the present embodiment, the sidewalls 52 of the cover 5 and the backlight unit 3 are connected in a state in which the liquid crystal panel 2 and the backlight unit 3 are held in the frame 4, such that four members 2 to 5 are integrally formed. As for the connection unit between the sidewalls 52 of the cover 5 and the backlight unit 3, engagement holes 52c which are engagement portions are formed in the sidewalls 52 and 52, engaging protrusions 3a engaged with the engagement holes 52c are integrally provided in the left and right ends of the backlight unit 3 of FIG. 4, and the connection is achieved by engagement between the engagement holes 52c and the engagement protrusions 3a. In addition, the configurations of the engagement portions provided in the cover 5 and the engagement portions provided in the backlight unit 3 corresponding thereto are arbitrary, but it is preferable that the engagement portions provided in the cover 5 are female engagement portions such as engagement holes 52c or concave portions and the engagement portions provided in the backlight unit 3 are male engagement portions such as engagement protrusions 3a or engagement claws. In the drawing, a reference numeral 43a denotes extension portions integrally protruding on the outer surface sides of the sidewalls 43 and 43 of the frame 4 outer than the sidewalls 52 of the cover 5. Concave portions 52a are formed in the sidewalls 52 and 52 in order to avoid interference with the extensions 43a, and the engagement holes 52c are formed in the downward protrusions 52b and 52b located on both sides of the concave portions 52a.

The engagement protrusions 3a engaged with the engagement holes 52c are provided on the left and right ends of the backlight unit 3 of FIG. 4 in correspondence with the engagement holes 52c two by two. In the drawing, a reference numeral 4c denotes guide protrusions provided on the outer surfaces of the ends of the sidewalls 43 and 43 of the frame 4 located on the side of the liquid crystal panel 2 rather than the engagement places between the engagement holes 52c and the engagement protrusions 3a. The first surface of one side (side of the liquid crystal panel 2) of each of the guide protrusions 4c is an inclined surface 4c1, a second surface opposite thereto is a horizontal surface, and the inclined surface 4c1 is inclined in a direction away from the liquid crystal panel 2. The inclined surface 4c1 preferably has a flat shape or a projecting curved surface shape having an arcuate cross section. In the present embodiment, the guide protrusions 4c are disposed at positions overlapping with the engagement protrusions 3a and are formed so as to protrude laterally rather than the engagement protrusions 3a.

When the engagement holes 52c of the cover 5 are engaged with the engagement protrusions 3a protruding to the side of the backlight unit 3, the cover 5 is moved from the end side of the sidewalls 52 so as to be externally fitted to the frame 4 for holding the liquid crystal panel 2 and the backlight unit 3, the sidewalls 52 are pressed and opened outwardly from the ends to the guide protrusions 4c, the ends of the sidewalls 52 get over the guide protrusions 4c and the engagement protrusions 3a, and the protrusions 4c are disposed in the engagement holes 52c such that the engagement holes 52c are engaged with the engagement protrusions 3a, thereby installing the cover 5. In particular, in the present embodiment, the ends of the sidewalls 52 are pressed smoothly outwardly by the inclined surfaces 4c1 of the guide protrusions 4c and thus the engagement holes 52c are smoothly engaged with the engagement protrusions 3a.

The inner side surface of the top plate 51 of the cover 5 mounted by the engagement between the engagement holes 52c and the engagement protrusions 3a is provided so as to be away from the end 43b of the illustrated light output side of the backlight unit 3 of the sidewalls 43 of the frame 4, and the inner side surfaces of the sidewalls 52 are provided so as to be in contact with the outer side surfaces of the sidewalls 43 of the frame 4.

Figure 5A:
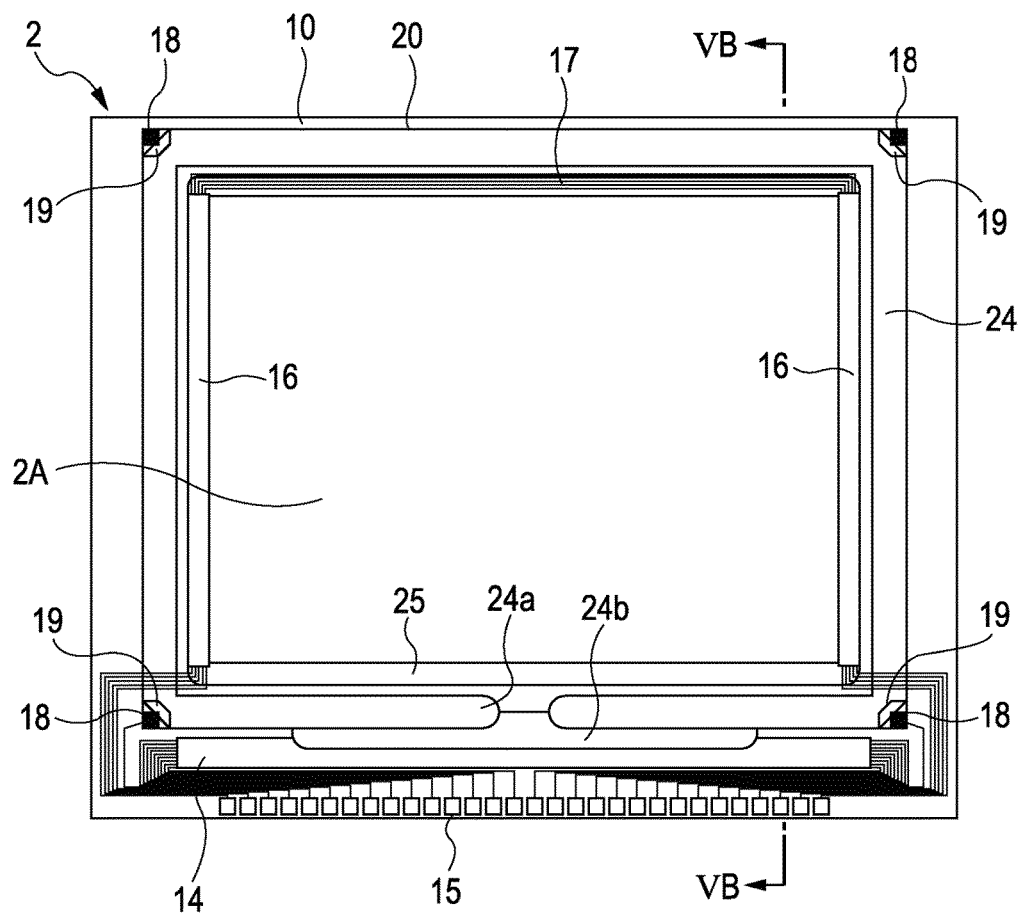
FIG. 5A is a plan view showing an example of the detailed configuration of a liquid crystal panel as an electro-optical panel and FIG. 5B is a cross-sectional view taken along line VB-VB of FIG. 5A.
Figure 5B:
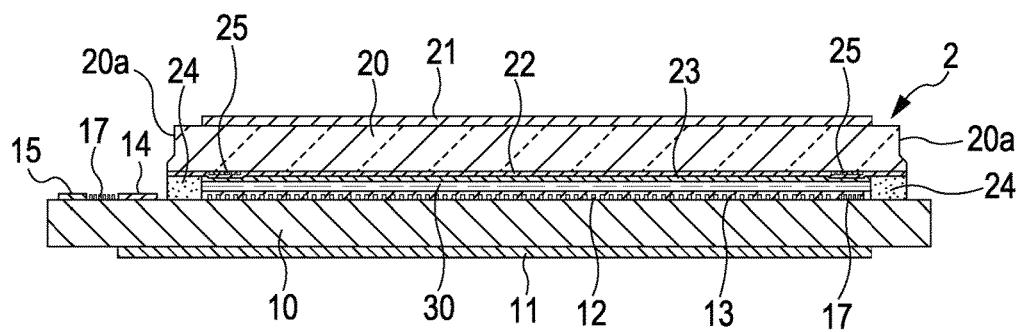

The configuration of the liquid crystal panel 2 as the electro-optical panel used in the liquid crystal device 1 of FIGS. 1 to 4 is arbitrary, but, in the first embodiment, an active-matrix-type liquid crystal panel using a thin-film transistor as a pixel switching element is used and the detailed configuration thereof will be described with reference to FIG. 5. FIG. 5A is a plan view showing the liquid crystal panel 2 and FIG. 5B is a cross-sectional view taken along line VB-VB of FIG. 5A.

In the liquid crystal panel 2 of the first embodiment, a thin-film transistor is provided on the device substrate (TFT array substrate) 10 formed of quartz, glass, silicon or the like, and the counter substrate 20 formed of glass, quart or the like and facing the device substrate 10 is provided. A pair of substrates, that is, the device substrate 10 and the counter substrate 20, are bonded by a seal material 24 provided in the periphery of the pixel region (image display region) 2A, and a liquid crystal layer 30 formed of an electro-optical material is filled between the device substrate 10 and the counter substrate 20 on the inside of the seal material 24. In FIG. 5A, a reference numeral 24a denotes a liquid injection port formed by removing a portion of the seal material 24, and a reference numeral 24b denotes a sealing material for blocking the liquid injection port 24a.

In the outer region of the seal material 24, that is, the outer peripheral region of the pixel region 2A, a data line driving circuit 14 for supplying image signals to data lines (not shown) at predetermined timings and driving the data lines and an external circuit connection terminal 15 are provided along one side of the device substrate 10. Scanning line driving circuits 16 for supplying scanning lines to scanning lines (not shown) at predetermined timings and driving the scanning lines are provided on the device substrate 10 in parallel with two sides adjacent to one side, in which the data line driving circuit 14 is provided, at a position facing a light-shielding film 25 provided inside the seal material 24. In one residual side of the device substrate 10, a plurality of lines 17 for connecting the sides of the scanning line driving circuits 16 opposite to the side of the external circuit connection terminal 15 is provided.

Vertical conduction terminals 19 are formed on the device substrate 10 at four corners of the seal material 24, and vertical conduction materials 18, of which the lower ends are in contact with the vertical conduction terminals 19 and the upper ends are in contact with the counter electrode 22, are provided between the device substrate 10 and the counter substrate 20. Electrical conduction between the device substrate 10 and the counter substrate 20 is accomplished by the vertical conduction materials 18.

On the device substrate 10, a pixel electrode 12 configuring a pixel or the like is provided, and an alignment layer 13 is provided at the side of the liquid crystal layer 30. On the counter substrate 20, the counter electrode 22 is provided over substantially the entire surface thereof and an alignment film 23 is provided at the side of the liquid crystal layer 30. The alignment films 13 and 23 are, for example, formed of transparent organic film such as a polyimide film, and the surfaces thereof are subjected to a rubbing process or the like such that the liquid crystal molecules in the liquid crystal layer 30 are aligned in a predetermined direction according to the voltage supplied to the liquid crystal layer 30.

Although, in the liquid crystal device 1 of FIGS. 1 to 4, the liquid crystal panel 2 of FIG. 5 are disposed and held in the frame 4 in a state in which the vertical position thereof is reversed, the direction of the liquid crystal panel 2 or the structure for holding the liquid crystal panel 2 by the frame 4 may be arbitrarily changed. In FIGS. 1 to 4, reference numerals 11 and 21 denote polarization plates provided on the device substrate 10 and the counter substrate 20 at the sides opposite to the liquid crystal layer 30, reference numerals 26 and 27 denote flexible printed circuit boards (FPCs) also functioning as conductive connection members for electrically connecting the liquid crystal panel 2 and the backlight unit 3 and an external power source or a signal input source, and reference numerals 41b and 41c denote concave portions formed in the sidewall 41 in order to prevent flexible printed circuit boards 29 and 30 from interfering with the sidewall 41 of the front side of the frame 4 when the liquid crystal panel 2 and the backlight unit 3 are received in the frame 4.

The backlight unit 3 used in the liquid crystal device 1 of FIGS. 1 to 4 has a configuration for irradiating the light from a light source such as an LED to the rear surface side of the liquid crystal panel 2 via a light guide body or a light diffusion plate, and this configuration member is covered by a casing or the like. The configuration member or the internal structure of the backlight unit 3 may be arbitrarily changed. In the drawing, the configuration member or the internal structure is omitted and only the appearance shape thereof is shown.

Method of Manufacturing Electro-optical Device of First Embodiment

Figure 6:
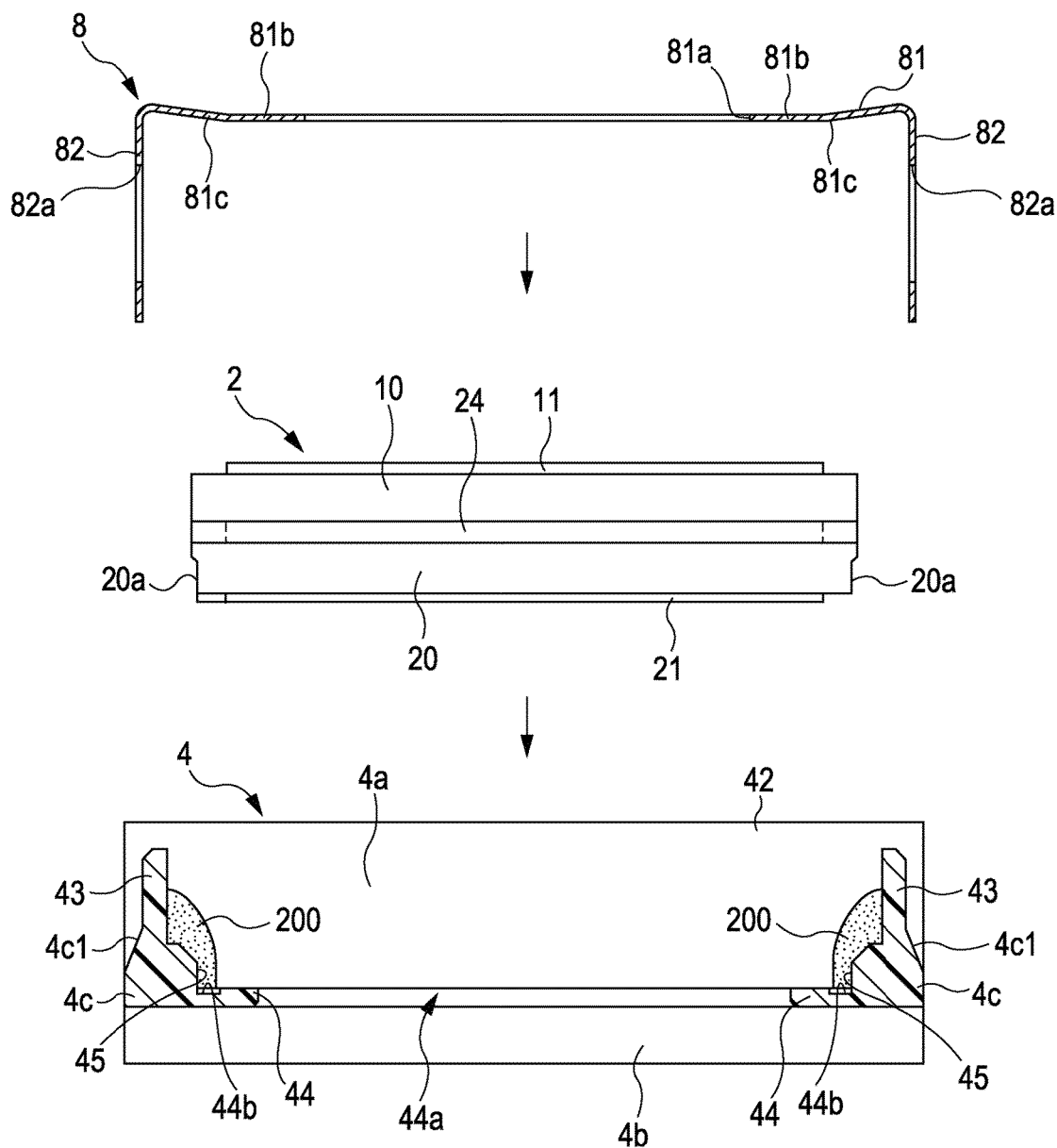
FIG. 6 is a cross-sectional explanatory view explaining a process of mounting a liquid crystal panel and a pressing jig in a frame.
Figure 8:
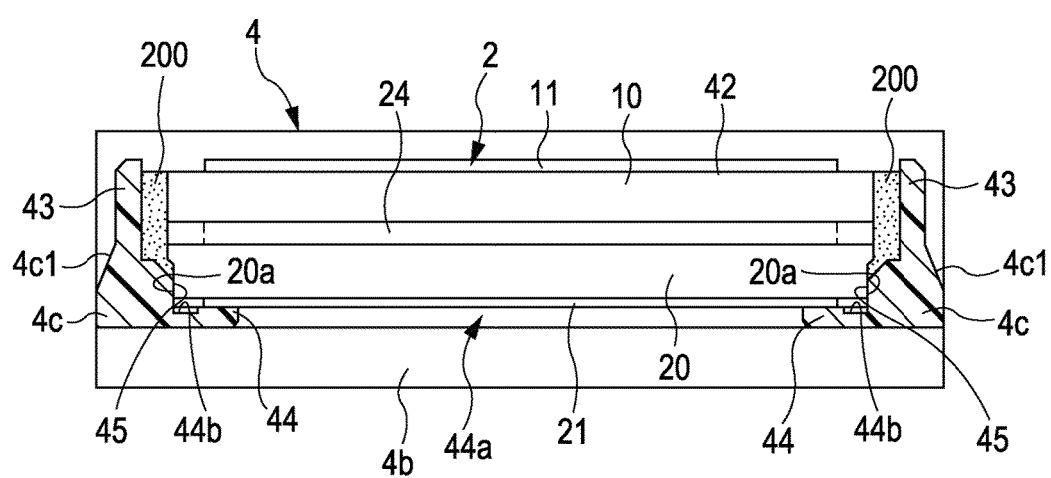
FIG. 8 is a cross-sectional explanatory view showing a state in which the pressing jig is detached from the state of FIG. 7.
Figure 9:
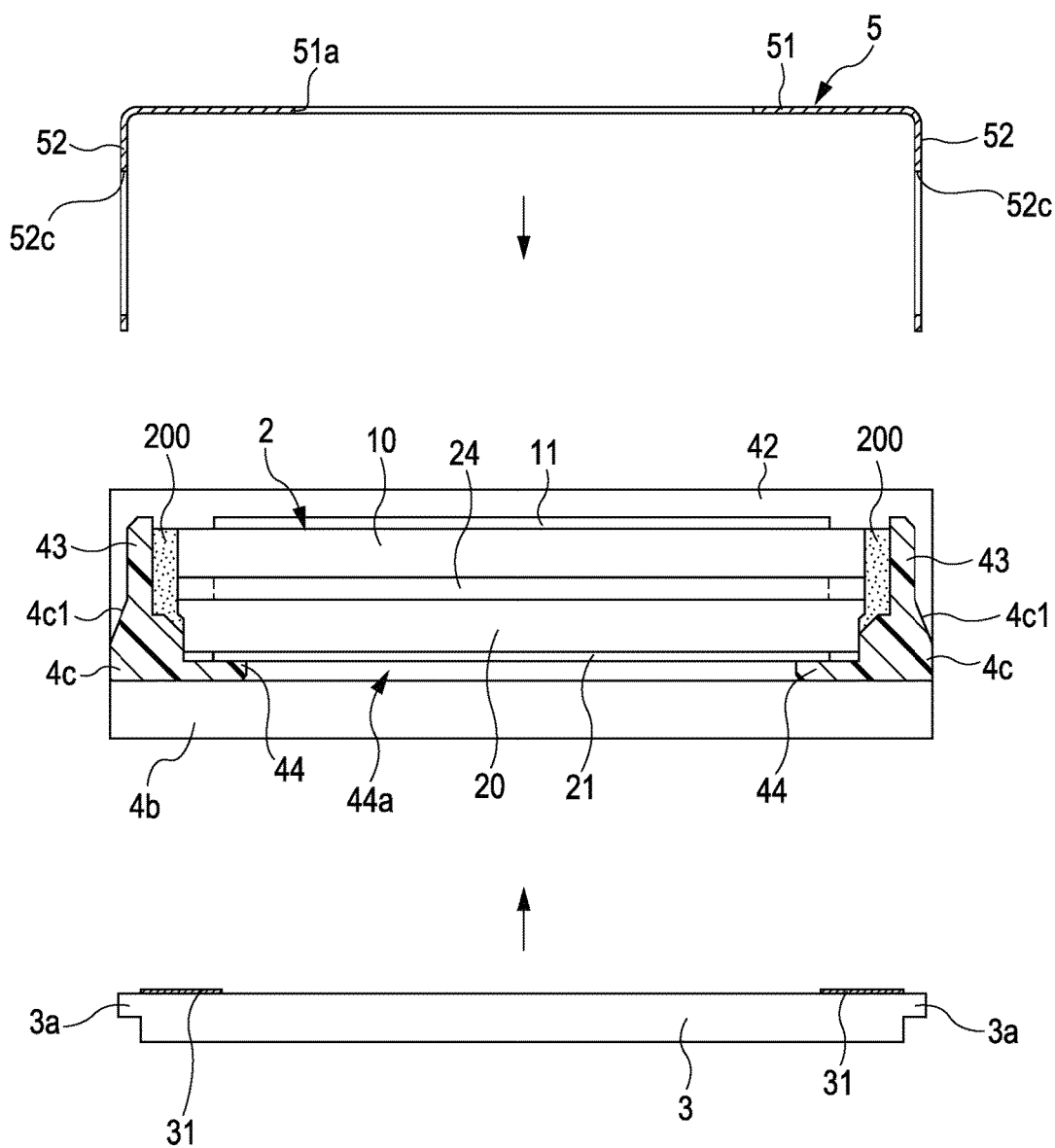
FIG. 9 is a cross-sectional explanatory view explaining a process of mounting a backlight unit and a cover in the frame which holds the liquid crystal panel.

Next, the method of manufacturing the liquid crystal device 1 which is the electro-optical device according to the first embodiment will be described. FIG. 6 is a cross-sectional explanatory view explaining a process of mounting the liquid crystal panel and a pressing jig in a frame, FIG. 7 is a cross-sectional explanatory view showing a state in which the liquid crystal panel and the pressing jig is mounted in the frame, FIG. 8 is a cross-sectional explanatory view showing a state in which the pressing jig is detached from the state of FIG. 7, and FIG. 9 is a cross-sectional explanatory view explaining a process of mounting a backlight unit and a cover in the frame which holds the liquid crystal panel.

Figure 7:
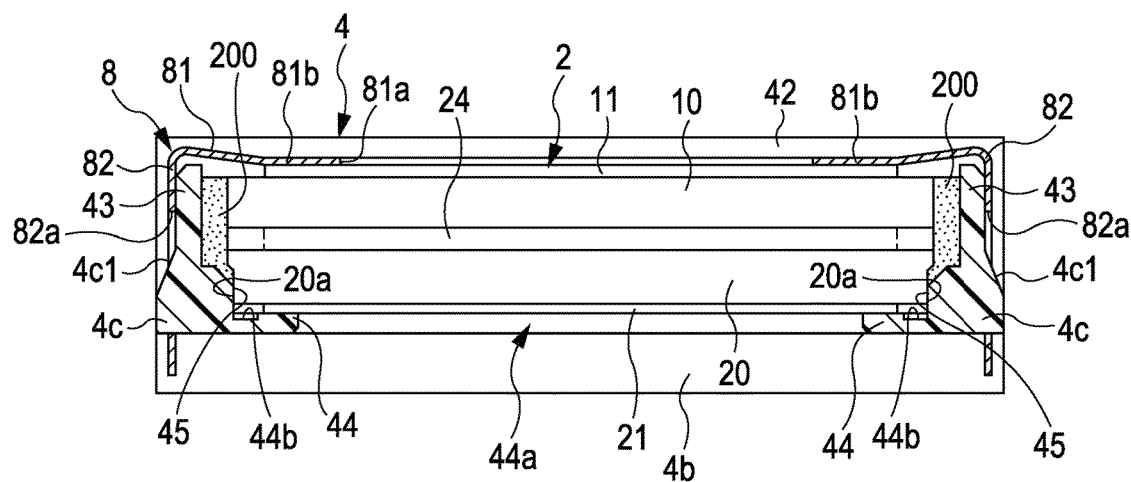
FIG. 7 is a cross-sectional explanatory view showing a state in which the liquid crystal panel and the pressing jig is mounted in the frame.

First, as shown in FIGS. 6 and 7, a first process of moving the liquid crystal panel 2 from one side of the frame 4 and mounting the liquid crystal panel 2 onto one side of the frame 4 is performed. In the first process, the adhesive 200 is coated on one surface of each of the supporting portions 44 (the upper surface of each of the support portions 44 in FIG. 6) of the frame 4 and the inner side surfaces of the sidewalls 43. At this time, concave adhesive pools 44b are provided in source portions of one surface of each of the support portions 44. When the adhesive 200 is collected, the adhesive 200 is easily collected in a predetermined region and good adhesion is preferably achieved.

Next, in the present embodiment, the liquid crystal panel 2 is moved from one side of the frame 4 such that the counter substrate 20 faces the frame 4, and the liquid crystal panel 2 is disposed in the concave portion 4a which is one side of the frame 4. In the concave portion 4a, the inner side surfaces 20a and 20a of the liquid crystal panel 2 are inserted and fitted between the fitting surfaces 45 and 45 of the frame 4, the liquid crystal panel 2 is mounted on the support portions 44, and the outer peripheral side surface of the liquid crystal panel 2 and the surface of the side of the support portions 44 (the device substrate 10, the seal material 24, the outer side surface of the counter substrate 20 and the outer side surface of the polarization plate 21) are bonded to the inner side surfaces of the sidewalls 43 including the fitting surfaces 45 and one side of each of the support portions 44 by the adhesive 200.

Next, the pressing jig 8 having elasticity is moved from one side of the frame 4 and is externally fitted to the frame 4 for holding the liquid crystal panel 2. The pressing jig 8 has a configuration similar to the cover 5, and includes a top plate 81 for covering one surface (the upper surface of FIGS. 6 and 7) of the liquid crystal panel 2 received in the frame 4 and sidewalls 82 and 82 bent from the top plate 81 at about a right angle at both ends of the width direction (the left-and-right direction of FIGS. 6 and 7) of the top plate 81. The top plate 81 is slightly bent at a bending portion 81c, and the central region inner of the bending portion 81c is formed so as to be located at the sidewalls 82 outer of the bending portion 81c. A window portion 81a formed by opening a portion at position corresponding to the pixel region 2A of the liquid crystal panel 2 is provided in the central region of the top plate 81, and the bending portion 81c of the top plate 81 is formed outer of the periphery 81b of the window portion 81a. Holes 82a are respectively formed in the sidewalls 82.

The pressing jig 8 is moved from one side such that the ends of the sidewalls 82 face the frame 4, and the inner surfaces of the sidewalls 82 are moved while being in contact with the outer surfaces of the sidewalls 43 of the frame 4. When the ends of the sidewalls 82 are brought into contact with the inclined surfaces 4c1 of the protrusions 4c of the frame 4, the ends of the sidewalls 82 are parallel with the inclined surfaces 4c1, the sidewalls 82 are pressed and opened outwardly, and the sidewalls 82 are guided to the protrusions 4c. When the lower edges of the holes 82a get over the protrusions 4c, the holes 82a formed in the sidewalls 82 of the pressing jig 8 are engaged with the protrusions 4c of the frame 4 and thus the pressing jig 8 is installed in the frame 4.

The top plate 81 of the pressing jig 8 installed by the engagement between the holes 82a and the protrusions 4c covers the peripheral region of the pixel region 2A of one surface of the liquid crystal panel 2, the region located between the bending portion 81c and the window portion 81a is in contact with the polarization plate 11, the liquid crystal panel 2 is energized to the supporting portions 44, and the surface (the polarization plate 21 of the counter substrate 20 in FIG. 7) opposite to one surface of the liquid crystal panel 2 presses the support portions 44, thereby stabilizing the bonding of the liquid crystal panel 2 and the support portions 44 by the adhesive 200. At this time, by the window portion 81a formed in the top plate 81, the pixel region 2A of the liquid crystal panel 2 is prevented from being pressed by the top plate 81 and display failure due to pressing can be prevented. In addition, the facing sidewalls 82 and 82 of the pressing jig 8 are disposed so as to cover a portion of the outer surfaces of the facing sidewalls 43 and 43 of the frame 4.

The pressing jig 8 is installed until the adhesive 200 is cured and the liquid crystal panel 2 and the support portions 44 are bonded by the adhesive 200 with certainty, and the liquid crystal panel 2 continues to be energized to the support portions 44 by the spring force of the flexure of the top plate 81 of the pressing jig 8. After they are bonded with certainty, as shown in FIG. 8, the pressing jig 8 is detached from the frame 4. During detachment, the sidewalls 82 of the pressing jig 8 are pressed and opened outwardly such that the engagement between the holes 82a and the protrusions 4c is released, and the pressing jig is detached from one side of the inserted frame 4. Preferably, thereafter, the display inspection of the liquid crystal panel 2 mounted in the frame 4 is performed; a next process is performed only with respect to a good product; the next process is not performed with respect to a bad product.

Next, as shown in FIGS. 9 and 4, as a second process, the backlight unit 3 is moved from the other side of the frame 4 with respect to the frame 4 for holding the liquid crystal panel 2, and the backlight unit 3 is mounted in the concave portion 4b, which is one side of the frame 4, so as to be disposed to face the liquid crystal panel 2. The backlight unit 3 is moved from the other side of the frame 4 in a state in which the side, in which the engagement protrusions 3a are formed, is the side of the frame 4 and the double-sided adhesive tape 31 is bonded to the surface facing the frame 4, is bonded to the support portions 44 or the other surfaces of the sidewalls 43 by the double-sided adhesive tape 31, and is mounted in the concave portion 4b. The engagement protrusions 3a of the backlight unit 3 are close to the protrusions 4c of the frame 4, are disposed at the position overlapping with the protrusions 4c in a planar manner, and protrude to positions inner of the protrusion portions 4c.

Thereafter, as shown in FIGS. 9 and 4, as a third process, the cover 5 is moved one side of the frame 4 to the frame 4 for holding the liquid crystal panel 2 and the backlight unit 3, and the inner surfaces of the sidewalls 52 are moved while being in contact with the outer surfaces of the sidewalls 43 of the frame 4. When the ends of the sidewalls 52 are in contact with the inclined surfaces 4c1 of the protrusions 4c of the frame 4, the ends of the sidewalls 52 are parallel with the inclined surfaces 4c1, the sidewalls 52 are pressed and opened outwardly, and the sidewalls 52 are guided to the protrusions 4c. If the lower edges of the engagement holes 52c get over the protrusions 4c and the engagement protrusions 3a, the engagement holes 52c positioned in the sidewalls 52 of the cover 5 are engaged with the engagement protrusions 3a of the backlight unit 3. Thus, the cover 5 is installed and externally installed in the frame 4. When the engagement holes 52c and the engagement protrusions 3a are engaged, the protrusions 4c are disposed so as to protrude into the engagement holes 52c.

According to the present embodiment, by engaging the engagement holes 52c of the sidewalls 52 of the cover 5 with the engagement protrusions 3a of the backlight unit 3, it is possible stably to hold the liquid crystal panel 2 and the backlight unit 3 by the frame 4 and the cover 5 while preventing the cover 5 from being detached. In addition, by guiding the sidewalls 52 of the cover 5 to the protrusions 4c of the frame 4 and engaging the engagement holes 52c and the engagement protrusions 3a, the cover 5 and the backlight unit 3 are smoothly engaged with certainty and thus the cover 5 can be installed. By releasing the engagement between the engagement holes 52c of the cover 5 and the engagement protrusions 3a of the frame 4, it is possible easily to detach the liquid crystal panel 2 and the backlight unit 3. When the repair or the replacement of the liquid crystal panel 2 or the backlight unit 3 is necessary, it is possible easily and rapidly to take countermeasures. In addition, even when the liquid crystal panel 2 or the backlight unit 3 is detached, it is possible to prevent the liquid crystal panel 2 or the backlight unit 3 from being detached from the frame 4.

By forming the first surfaces of the protrusions 4c of the frame 4 to become the inclined surfaces 4c1 inclined in the direction away from the liquid crystal panel 2, the sidewalls 52 of the cover 5 are guided to the inclined surfaces 4c1 such that the engagement holes 52c are more easily led to the engagement protrusions 3a. In addition, by arranging the protrusions 4c of the frame 4 and the engagement protrusions 3a of the backlight unit 3 at the overlapping position in the planer manner, maximum deformation places due to the protrusions 4c of the sidewalls 52 of the cover 5 can overlap with the engagement protrusions 3a, the deformation of the sidewalls 52 of the cover 5 can be suppressed during guiding or detachment, stress applied to the cover 5 due to deformation can be suppressed. By protruding the protrusions 4c of the frame 4 outer of the engagement protrusions 3a of the backlight unit 3, it is possible to deform the sidewalls 52 of the cover 5 outer of the engagement protrusions 3a and more easily engage the engagement holes 52c of the sidewalls 52 of the cover 5 with the engagement protrusions 3a.

By pressing the liquid crystal panel 2 to the support portions 44 coated with the adhesive 200 by the pressing jig 8, it is possible to bond the liquid crystal panel 2 to the support portions 44 with high strength. In addition, since the liquid crystal panel 2 and the backlight unit 3 are separately mounted in the frame 4, for example, display inspection is performed after the liquid crystal panel 2 is mounted in the frame 4 and the backlight unit 3 is mounted with respect to a good product. Accordingly, it is possible to prevent extra cost from occurring.

Modified Example of Embodiment

The invention is not limited to the above-described embodiments and modifications and changes within the range capable of achieving the advantages of the invention are included in the invention. For example, although, in the above-described embodiments, the invention is applied to the liquid crystal device as the electro-optical device and the active matrix type liquid crystal panel is used as the electro-optical panel, a passive matrix type liquid crystal panel may be used, and an electro-optical device using various types of electro-optical panels instead of the liquid crystal panel may be used.

Figure 10:
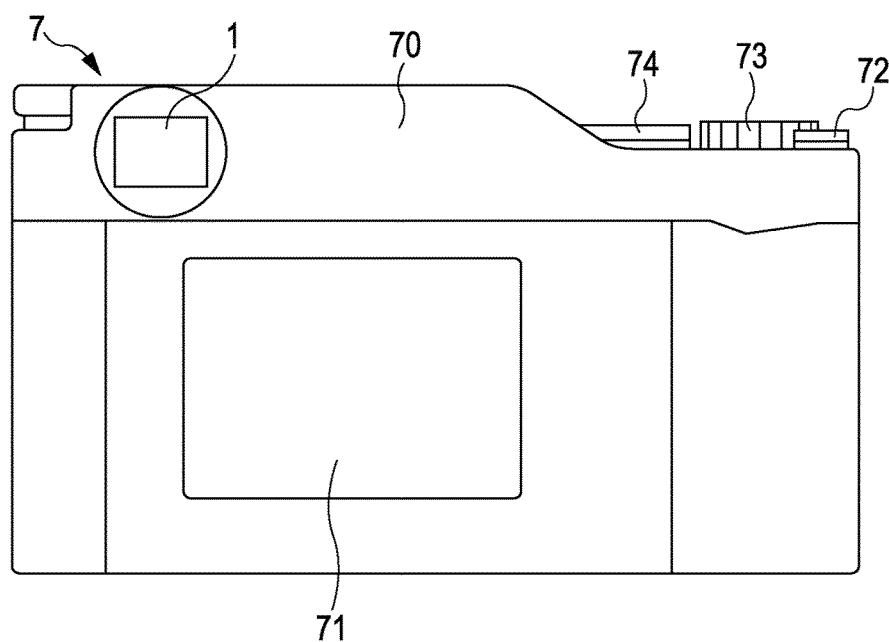
FIG. 10 is a rear view of a digital camera as an electronic apparatus using a liquid crystal device as an electro-optical device of the invention.

The electro-optical device of the invention may be used as display units of various types of electronic apparatuses. FIG. 10 shows an example, in which the liquid crystal device 1 according to the embodiment is used as an electronic viewfinder (EVF) of a digital camera 70 as an electronic apparatus 7. In the drawing, a reference numeral 71 denotes an image display monitor, a reference numeral 72 denotes a shutter button, a reference numeral 73 denotes a dial switch, and a reference numeral 74 denotes a power source button.

The electronic apparatus using the electro-optical device according to the invention is not limited to the digital camera 70 and is applicable to various types of electronic apparatus. For example, the invention may widely be used in electronic apparatus such as a portable information apparatus such as a mobile telephone or a Personal Digital Assistant (PDA), a mobile personal computer, a personal computer, a workstation, a digital camera, a vehicle monitor, a digital video camera, a liquid crystal television set, a viewfinder-type or direct-view monitor type video tape recorder, a car navigation system, a pager, an electronic organizer, an electronic calculator, a word processor, a videophone, a POS terminal, and a touch-panel-equipped device.

What is claimed is:

1. An electro-optical device comprising:
   an electro-optical panel;
   a backlight unit disposed so as to face the electro-optical panel;
   a cover including a window portion opened in correspondence with a pixel region of the electro-optical panel and a first sidewall provided so as to face the side surfaces of the electro-optical panel and the backlight unit, the first sidewall having an engagement hole engaged with the backlight unit;
   a frame which holds the electro-optical panel and the backlight unit and has a second sidewall provided so as to face the side surfaces of the electro-optical panel and the backlight unit, the second sidewall having a protrusion for guiding the engagement hole to an engagement place; and
   an engagement protrusion provided so as to protrude from the side surface of the backlight unit,
   wherein:
      the cover and the backlight are fixed by engaging the engagement hole with the engagement protrusion, and
      the protrusion is disposed at a position overlapping with the engagement protrusion in a planer manner.

2. The electro-optical device according to claim 1, wherein:
   the protrusion has a first surface formed on the side of the electro-optical panel and a second surface formed on the opposite side of the electro-optical panel, and
   the first surface is formed of an inclined surface inclined in a direction away from the electro-optical panel.

3. The electro-optical device according to claim 1, wherein the protrusion is provided so as to protrude further than the engagement protrusion.

4. An electronic apparatus comprising the electro-optical device according to claim 1.

5. An electro-optical device comprising:
   an electro-optical panel;
   a backlight unit disposed so as to face the electro-optical panel;
   a cover including a window portion opened in correspondence with a pixel region of the electro-optical panel and a first sidewall provided so as to face the side surfaces of the electro-optical panel and the backlight unit, the first sidewall having an engagement portion engaged with the backlight unit; and
   a frame which holds the electro-optical panel and the backlight unit and has a second sidewall provided so as to face the side surfaces of the electro-optical panel and the backlight unit, the second sidewall having a protrusion for guiding the engagement portion to an engagement place,
   wherein:
      the protrusion has a first surface formed on the side of the electro-optical panel and a second surface formed on the opposite side of the electro-optical panel, and
      the first surface is formed of an inclined surface inclined in a direction away from the electro-optical panel.

6. An electro-optical device comprising:
   an electro-optical panel;
   a backlight unit disposed so as to face the electro-optical panel;
   a cover including a window portion opened in correspondence with a pixel region of the electro-optical panel and a first sidewall provided so as to face the side surfaces of the electro-optical panel and the backlight unit, the first sidewall having an engagement hole engaged with the backlight unit;
   a frame which holds the electro-optical panel and the backlight unit and has a second sidewall provided so as to face the side surfaces of the electro-optical panel and the backlight unit, the second sidewall having a protrusion for guiding the engagement hole to an engagement place; and
   an engagement protrusion provided so as to protrude from the side surface of the backlight unit,
   wherein:
      the cover and the backlight are fixed by engaging the engagement hole with the engagement protrusion, and
      the protrusion is provided so as to protrude further than the engagement protrusion.

* * * * *